(12) United States Patent
Nakajima (10) Patent No.: US 8,923,111 B2
(45) Date of Patent: Dec. 30, 2014

(54) WIRELESS TRANSMISSION METHOD AND WIRELESS TRANSMISSION DEVICE

(75) Inventor: Hiroaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 89 days.

(21) Appl. No.: 13/141,364

(22) PCT Filed: Feb. 3, 2010

(86) PCT No.: PCT/JP2010/051482
§ 371 (c)(1),
(2), (4) Date: Jun. 22, 2011

(87) PCT Pub. No.: WO2010/090205
PCT Pub. Date: Aug. 12, 2010

(65) Prior Publication Data
US 2012/0020289 A1    Jan. 26, 2012

(30) Foreign Application Priority Data
Feb. 3, 2009    (JP) ................... 2009-022544

(51) Int. Cl.
*G01R 31/08*    (2006.01)
*H04B 7/14*    (2006.01)
*H04L 1/22*    (2006.01)
*H04W 28/06*    (2009.01)

(52) U.S. Cl.
CPC .............. *H04L 1/22* (2013.01); *H04W 28/065* (2013.01)
USPC ............................ 370/217; 370/315; 370/401

(58) Field of Classification Search
None
See application file for complete search history.

(56) References Cited

U.S. PATENT DOCUMENTS

| | | | | |
|---|---|---|---|---|
| 5,898,690 A | * | 4/1999 | Masashi ........................ | 370/401 |
| 8,139,512 B2 | * | 3/2012 | Charbit et al. ................ | 370/279 |

(Continued)

FOREIGN PATENT DOCUMENTS

| | | |
|---|---|---|
| CN | 1925371 A | 3/2007 |
| JP | 2-268097 A | 11/1990 |

(Continued)

OTHER PUBLICATIONS

International Search Report for PCT/JP2010/051482 mailed May 18, 2010.

(Continued)

*Primary Examiner* — Gregory Sefcheck
*Assistant Examiner* — Joshua Smith
(74) *Attorney, Agent, or Firm* — Sughrue Mion, PLLC (57) ABSTRACT

An external signal is received by the first wireless transmission device of one wireless transmission device group, and then is divided. One divided signal is transmitted to the first wireless transmission device of the other wireless transmission device group opposite to the one wireless transmission device group, and the other divided signal is transmitted to the second wireless transmission device of the one wireless transmission device group. In the same manner, in the second, third, . . . , wireless transmission devices of the one wireless transmission device group, an input signal is divided into two signals, and the divided signals are each transmitted to the opposing wireless transmission device of the other wireless transmission device group and to the adjacent wireless transmission device of the one wireless transmission device group. The wireless transmission devices of the other wireless transmission device group each extracts a signal from the wireless signal transmitted from the opposing wireless transmission device of the one wireless transmission device group, and transmits the signal to the preceding adjacent wireless transmission device of the other wireless transmission device group. The first wireless transmission devices of the other wireless transmission device group combines a signal extracted from the wireless signal transmitted from the first wireless transmission device of the one wireless transmission device group and a signal transmitted from the second wireless transmission device of the other wireless transmission device group together, and outputs the combined signal to the outside.

16 Claims, 10 Drawing Sheets

(56) References Cited

U.S. PATENT DOCUMENTS

| | | | |
|---|---|---|---|
| 2004/0018854 A1* | 1/2004 | Gorsuch | 370/338 |
| 2008/0108369 A1* | 5/2008 | Visotsky et al. | 455/455 |
| 2008/0144572 A1* | 6/2008 | Makhijani | 370/330 |
| 2008/0219222 A1* | 9/2008 | Lo et al. | 370/337 |
| 2010/0317284 A1* | 12/2010 | Charbit et al. | 455/7 |

FOREIGN PATENT DOCUMENTS

| | | |
|---|---|---|
| JP | 2002135304 A | 5/2002 |
| JP | 2003318839 A | 11/2003 |
| JP | 2004349764 A | 12/2004 |
| JP | 2004350331 A | 12/2004 |
| JP | 2005217565 A | 8/2005 |
| JP | 2005229201 A | 8/2005 |
| JP | 2006067239 A | 3/2006 |
| JP | 2008219684 A | 9/2008 |

OTHER PUBLICATIONS

Chinese Office Action for CN Application No. 201080006147.1 issued on Mar. 12, 2014 with English Translation.

* cited by examiner

| case | detected state/alarm | | | | | link control of external LAN port of local station |
|---|---|---|---|---|---|---|
| | local station | | opposing station | | | |
| | wireless-signal quality degradation | link state of branch LAN port | wireless-signal quality degradation | link state of external LAN port | link state of branch LAN port | |
| 1 | – | – | – | link down | – | link-down control |
| 2 | detected | link down | – | – | – | link-down control |
| 3 | detected | – | – | – | – | link-down control |
| 4 | – | link down | detected | – | link down | link-down control |
| 5 | – | – | detected | – | link down | link-down control |
| 6 | others | | | | | link-down control |

Fig. 7

| case | detected state/alarm | | | | link control of external LAN port of local station |
|---|---|---|---|---|---|
| | local station | opposing station | | | |
| | wireless-signal quality degradation | wireless-signal quality degradation | link state of external LAN port | | |
| 1 | – | – | link down | | link-down control |
| 2 | detected | – | – | | link-down control |
| 3 | – | detected | – | | link-down control |
| 4 | others | | | | link-down control |

Fig.8

| case | detected state/alarm | | | link control of branch LAN port of local station |
|---|---|---|---|---|
| | local station | opposing station | | |
| | link state of external LAN port | link state of external LAN port | link state of branch LAN port | |
| 1 | link down | – | – | link-down control |
| 2 | – | link down | – | link-down control |
| 3 | – | – | link down | link-down control |
| 4 | others | | | link-down control |

WIRELESS TRANSMISSION METHOD AND WIRELESS TRANSMISSION DEVICE

This application is the National Phase of PCT/JP2010/051482, filed Feb. 3, 2010, which claims priority to Japanese Patent Application No. 2009-022544 filed on Feb. 3, 2009, the disclosure of which is incorporated herein.

TECHNICAL FIELD

The present invention relates to a wireless transmission system in which two wireless transmission device groups connected to respective user networks transmit LAN (Local Area Network) signals received from the respective user networks to each other.

BACKGROUND ART

Approaches to increasing the transmission capacity in a wireless transmission system have typically included the use of a multi-valued modulation scheme and the expansion of a wireless band. Unfortunately, the use of a multi-valued scheme involves a short transmission distance due to a low tolerance for fluctuations in a wireless transmission path, and the band expansion may not be allowed due to the absence of specification in related laws. One solution for these problems is the wireless transmission system shown in FIG. 1.

External LAN signal 100 (MAC [Media Access Control] frames compliant with IEEE 802.3) from user network 10 is input to layer 2 switch (L2SW) 50. L2SW 50 divides external LAN signal 100 on a MAC frame basis and outputs the signals as divided LAN signals 110-1, 110-2, ..., 110-n to wireless transmission devices 60-1, 60-2, ..., 60-n, respectively. Wireless transmission devices 60-1, 60-2, ..., 60-n perform wireless modulation for input divided LAN signals 110-1, 110-2, ..., 110-n and output the modulated signals as wireless signals 201-1, 201-2, ..., 201-n to opposing wireless transmission devices 70-1, 70-2, ..., 70-n, respectively. Wireless transmission devices 70-1, 70-2, ..., 70-n demodulate received wireless signals 201-1, 201-2, ..., 201-n to extract LAN signals and output the LAN signals as divided LAN signals 510-1, 510-2, ..., 510-n to L2SW 80. L2SW 80 combines divided LAN signals 510-1, 510-2, ..., 510-n and outputs the combined signal as external LAN signal 500 to user network 40. Wireless transmission devices 70-1, 70-2, ..., 70-n perform wireless modulation for input divided LAN signals 510-1, 510-2, ..., 510-n and output the modulated signals as wireless signals 601-1, 601-2, ..., 601-n to opposing wireless transmission devices 60-1, 60-2, ..., 60-n, respectively. In a similar manner, a LAN signal is transmitted in the direction from user network 40 to user network 10. Accordingly, in the wireless transmission system shown in FIG. 1, the transfer capacity can be increased by increasing the number of wireless transmission devices between L2SW 50 and L2SW 80.

Figure 1:
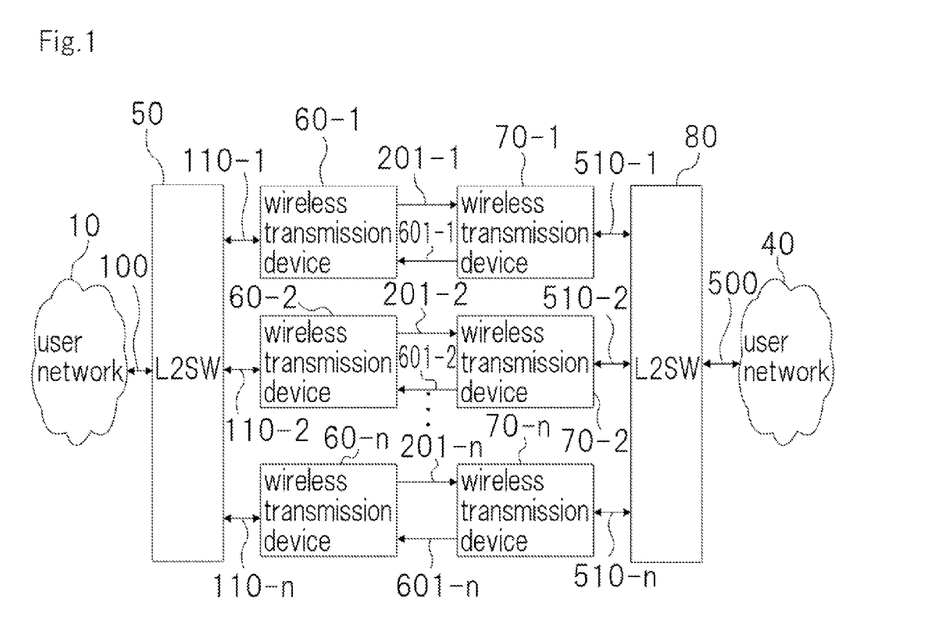
FIG. 1 is a block diagram of a wireless transmission system in a conventional example.

L2SW 50 and L2SW 80 include a link aggregation function without LACP (Link Aggregation Control Protocol), as described in Patent Literature 1. Wireless transmission devices 60-1 to 60-n and 70-1 to 70-n include a function of linking down a divided LAN signal port of an opposing wireless transmission device when a link-down state of their own divided LAN signal port is detected, as described in Patent Literatures 2 and 3. Therefore, upon detection of quality degradation of a wireless signal directed either from the local wireless transmission device to the opposing wireless transmission device, or from the opposing wireless transmission device to the local wireless transmission device, the divided LAN signal ports of the local and opposing wireless transmission devices can be linked down. L2SW 50 and L2SW 80 can be notified of the abnormal condition, and the signal transmission can be stopped.

In this manner, combining the L2SWs in Patent Literature 1 and the wireless transmission devices in Patent Literatures 2 and 3 allows increasing the transmission capacity without expanding the wireless band and also allows eliminating the need of complicated LACP processing required in link aggregation.

However, implementing a wireless system with the combination of the inventions described in the above Patent Literatures requires installing the L2SWs apart from the wireless transmission devices, which increases the overall system cost. In addition, the L2SWs as separate devices from the wireless transmission devices pose the problem of cumbersome installation work and maintenance, and the L2SWs as devices different in type from the wireless transmission devices pose the problem of difficulty in providing a common monitoring and controlling network.

Next, combinations different from the combination of the above Patent Literatures will be described with reference to FIGS. 2 and 3.

Figure 2:
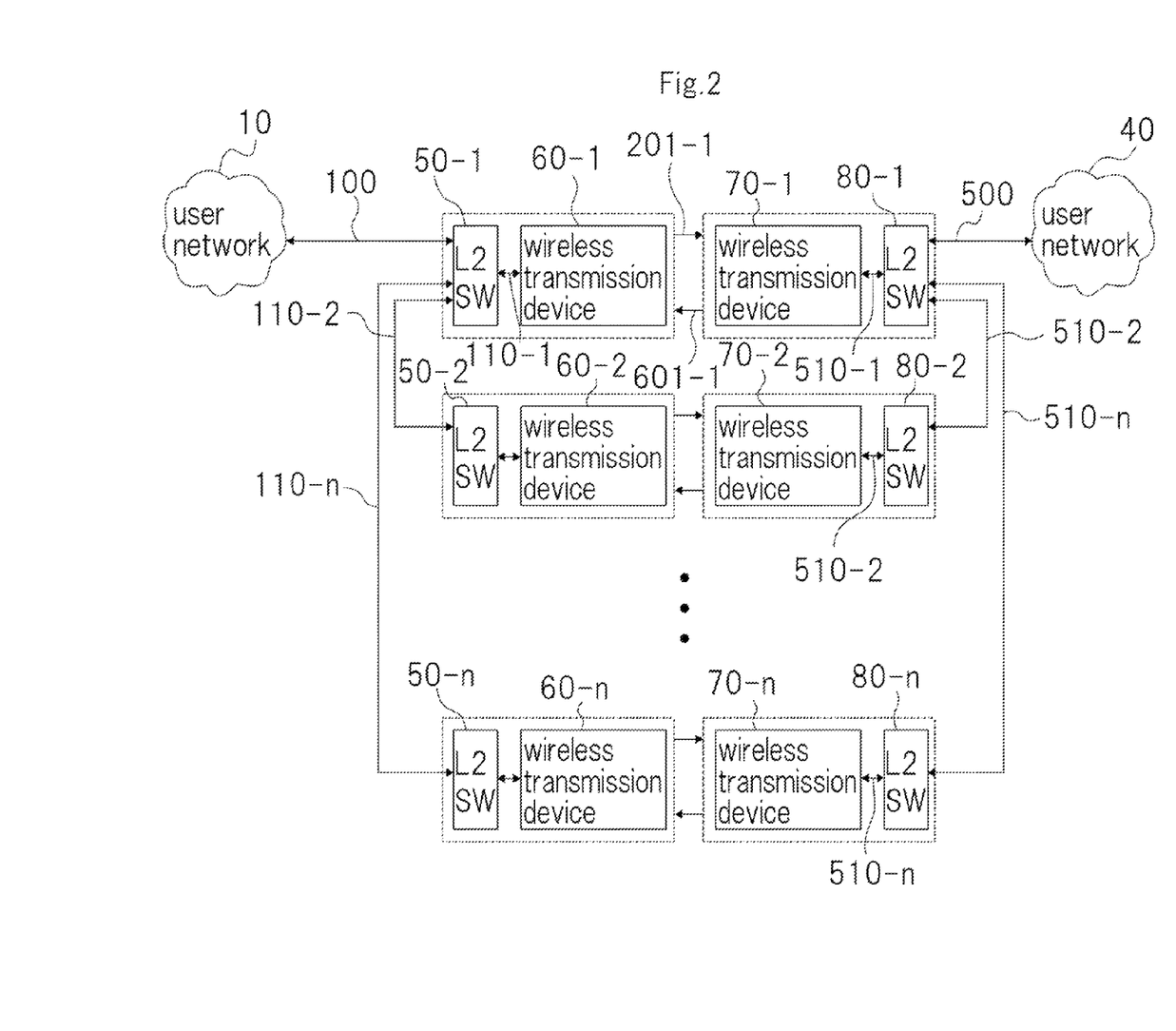
FIG. 2 is a block diagram of a wireless transmission system in another conventional example.

A wireless transmission system in FIG. 2 connects wireless transmission devices in a star topology, in which L2SW 50 in FIG. 1 corresponds to L2SW 50-1, L2SW 50-2, L2SW 50-n, and L2SW 80 in FIG. 1 corresponds to L2SW 80-1, L2SW 80-2, ..., L2SW 80-n, and these L2SWs are connected to wireless transmission devices 60-1, 60-2, ..., 60-n and 70-1, 70-2, ..., 70-n, respectively. LAN signal 100 from user network 10 is divided into n signals on a MAC frame basis by L2SW 50-1 for wireless transmission device 60-1 in the first stage. One (110-1) of the n signals is output to wireless transmission device 60-1, and the remaining n−1 signals (110-2 to 110-n) are output to n−1 adjacent wireless transmission devices 60-2 to 60-n. LAN signals 510-1 to 510-n transmitted via wireless transmission devices 60-1 to 60-2 and 70-1 to 70-n in n stages are combined by L2SW 80-1 for wireless transmission device 70-1 and are output as external LAN signal 500 to user network 40.

In this manner, in the wireless transmission system in FIG. 2, each of the wireless transmission devices connected to the user networks is connected with its adjacent wireless transmission device in a star topology to provide connection to the user network. As a result, the wireless transmission device aggregates the wireless transmission paths, so that transmission capacity can be increased according to the number of adjacent wireless transmission devices. When an abnormal condition in a wireless transmission path occurs, link down control is performed for an internal LAN signal port, of a relevant wireless transmission device, serving as a connection terminal to the L2SW, to provide notification to the L2SW of the abnormal condition. Since the L2SW does not use the linked-down port for signal transmission according to the link aggregation function, signal transmission using only wireless transmission devices with normal wireless transmission paths is possible.

However, in the wireless transmission system in FIG. 2, the wireless transmission device connected to the user network receives concentrated connections from its adjacent wireless transmission devices. Accordingly, interfaces as many as the adjacent wireless transmission devices are necessary, posing the problem of difficulty in reducing the size and cost of the devices. In addition, the adjacent wireless transmission devices require the L2SW function only to be connected with the wireless transmission device connected to the user network, posing the problem of difficulty in reducing the device cost. Even if the L2SW function is removed from the adjacent wireless transmission devices, it will result in collectively handling the wireless transmission devices of different types, posing the problem of cumbersome installation work and maintenance.

Figure 3:
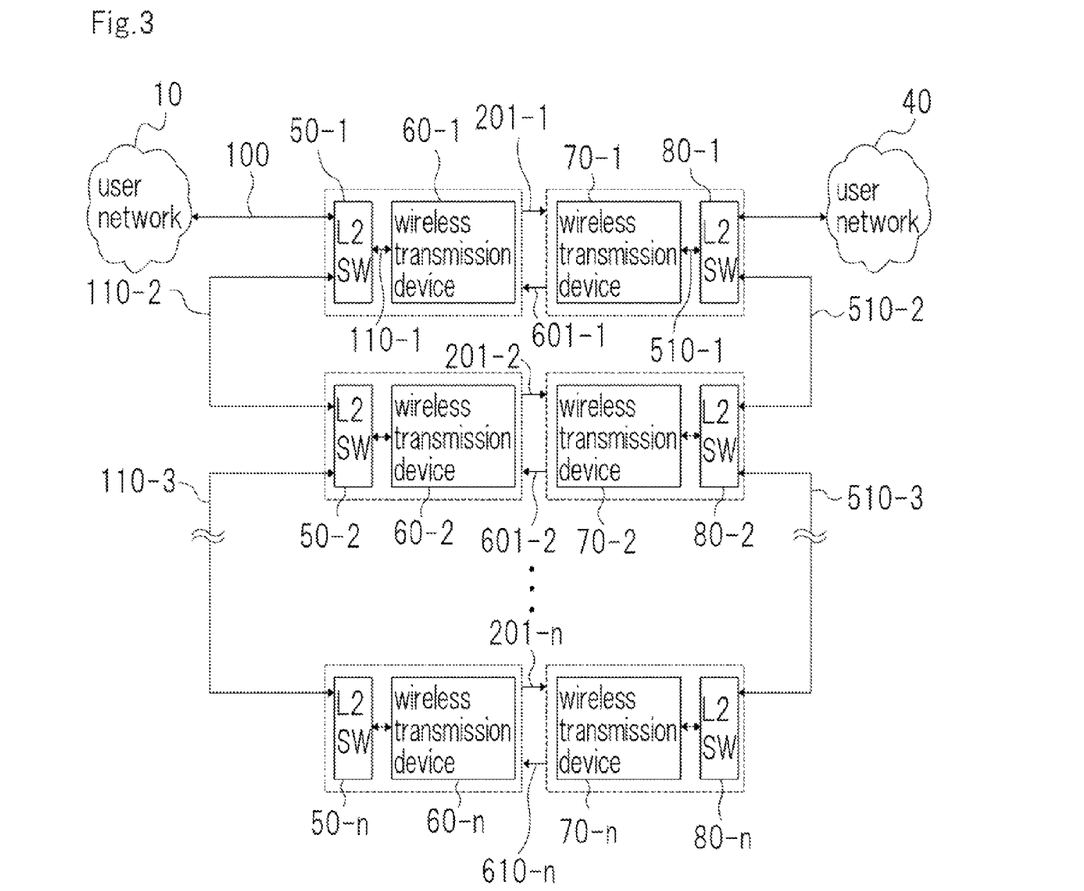
FIG. 3 is a block diagram of a wireless transmission system in still another conventional example.

FIG. 3 shows a wireless transmission system with the same internal configuration as the wireless transmission system in FIG. 2 but with different connections between devices. Specifically, the wireless transmission system in FIG. 3 cascades all wireless transmission devices, so that wireless transmission device 60-1 connected to user network 10 is connected with adjacent wireless transmission device 60-2, wireless transmission device 70-1 is connected with adjacent wireless transmission device 70-2, wireless transmission device 60-2 is connected with adjacent wireless transmission device 60-3 (not shown), wireless transmission device 70-2 is connected with adjacent wireless transmission device 70-3 (not shown), and so on.

In the wireless transmission system in FIG. 3, the adjacent wireless transmission devices are cascaded to bundle the wireless transmission paths, so that transmission capacity can be increased according to the number of wireless transmission devices. Once detecting an abnormal condition in a wireless transmission path or in a wireless transmission device, the wireless transmission system in FIG. 3 performs link down control for the internal LAN signal port serving as a connection with the L2SW to notify the L2SW of the abnormal condition. Since the L2SW does not use the linked-down ports for signal transmission according to the link aggregation function, signal transmission can be continued by using only wireless transmission devices with normal wireless transmission paths.

However, in the wireless transmission system in FIG. 3, cost reduction of the wireless transmission devices is difficult because all the wireless transmission devices have the L2SW capable of the link aggregation function. If a simple and inexpensive L2SW without the link aggregation function is applied to the adjacent wireless transmission devices, the result will be that the wireless transmission device of one type connected to the user network and the adjacent wireless transmission devices of another type are lined up. This poses the problem of cumbersome installation work and maintenance.

Further, although the wireless transmission systems in FIGS. 2 and 3 are integrated systems, at the occurrence of an abnormal condition in a wireless transmission path or in a wireless transmission device, the L2SW block of the local wireless transmission device needs to be notified of the abnormal condition in the form of link-down of the internal LAN signal port. This makes fast control difficult compared with directly linking down a LAN port external to the device.

CITATION LIST

Patent Literature

Patent Literature 1: JP2004-349764A
Patent Literature 2: JP2005-217565A
Patent Literature 3: JP2006-67239A

SUMMARY OF INVENTION

Problems to be Solved by the Invention

It is an object of the present invention to provide a wireless transmission method and a wireless transmission device that are capable of easily increasing transmission capacity without changing the wireless modulation scheme or the wireless band.

Means to Solve the Problems

A signal that is input is divided by a first wireless transmission device into two signals, one signal being transmitted to a second wireless transmission device opposite to the first wireless transmission device, the other signal being output to a third wireless transmission device that is adjacent to the first wireless transmission device. The other signal is further transmitted via a fourth wireless transmission device opposite to the third wireless transmission device to the second wireless transmission device that is adjacent to the fourth wireless transmission device. The signals received respectively from the first and fourth wireless transmission devices are combined and output by the second wireless transmission device.

Effects of the Invention

Firstly, wireless transmission capacity can be increased depending on the number of combined wireless transmission devices without changing the wireless modulation scheme or the wireless band. The reason for this is as follows. A signal received from a user network is divided, and the divided signal is transmitted to the adjacent wireless transmission device in the local wireless transmission device group by using a wireless transmission path of the adjacent wireless transmission device. The adjacent wireless transmission device similarly divides the received signal and transmits a signal extracted from the divided wireless signal to each wireless transmission device in the opposing wireless transmission device group. In this manner, wireless transmission paths can be aggregated, thus increasing transmission capacity depending on the number of wireless transmission devices.

Secondly, all the wireless transmission devices in each wireless transmission device group can have the same configuration, thus enabling reductions of the size and cost of the wireless transmission devices. The reason for this is, since the above-described wireless transmission devices are cascaded, each device only needs to include a branch port for connecting with the adjacent device, and unlike in a hub station in a star connection, the same number of interfaces, as they are devices, is not needed.

REFERENCE SIGNS LIST 10, 40 user network
20-1 to 20-n, 30-1 to 30-n wireless transmission device
21, 31 division circuit
22, 22a, 22b, 32 transmission circuit
23, 23a, 23b, 33 reception circuit
24, 34 control circuit
25, 27, 35 external LAN port
26, 28, 36 branch LAN port
100, 500 external LAN signal
101, 501 transmitted signal
102, 502 divided LAN signal
103, 503 link state notification signal
201, 601 wireless signal
301, 701 received signal
302, 702 transferred alarm signal
401, 801 link control signal
402, 802 alarm signal

BEST MODE FOR CARRYING OUT THE INVENTION

Exemplary embodiments of the present invention will now be described with reference to the drawings.

First Exemplary Embodiment

Figure 4:
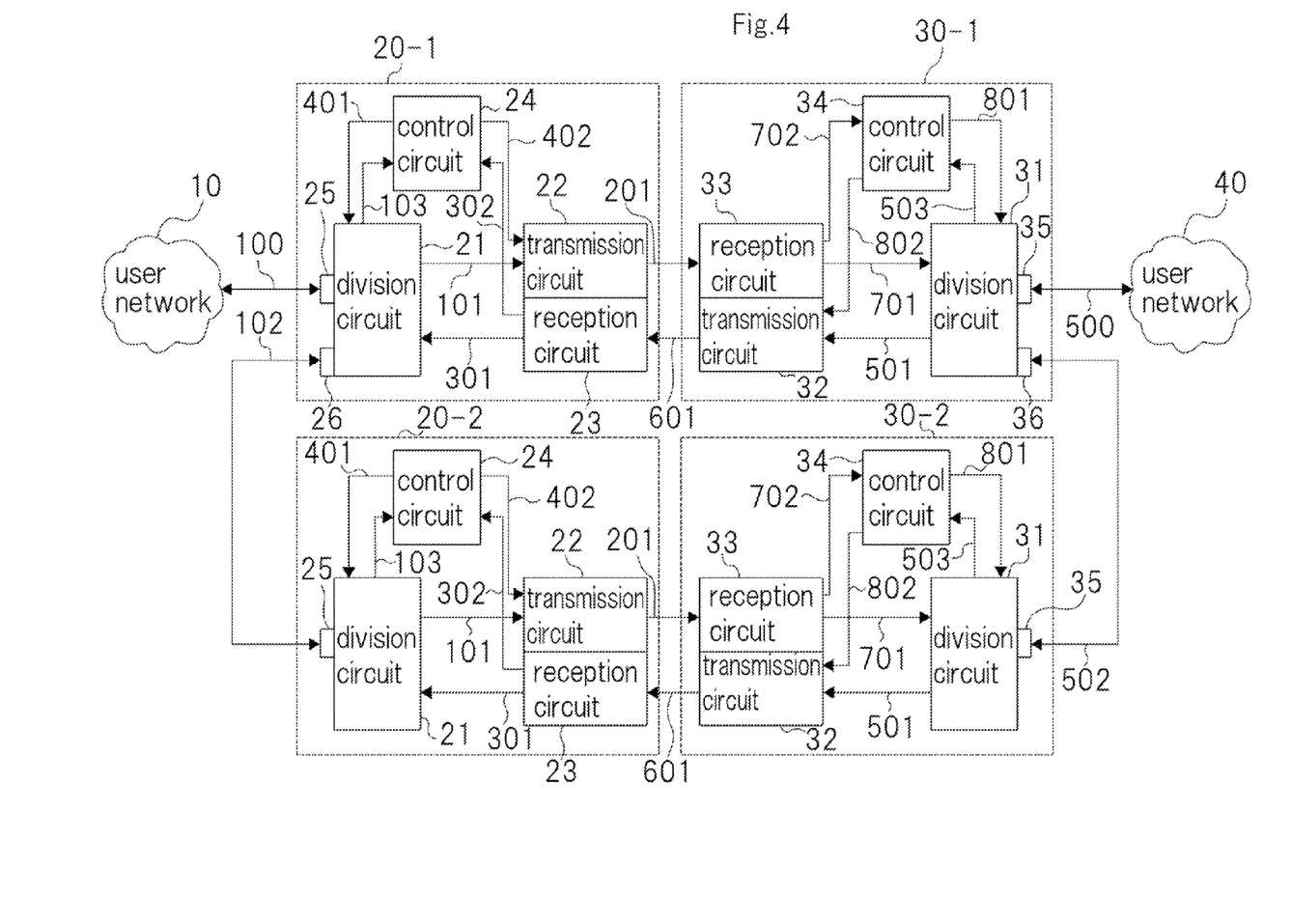
FIG. 4 is a block diagram of a wireless transmission system according to a first exemplary embodiment of the present invention.

FIG. 4 is a block diagram of a wireless transmission system according to a first exemplary embodiment of the present invention.

The wireless transmission system in this exemplary embodiment comprises cascaded wireless transmission devices 20-1 and 20-2 in a local station connected to user network 10, and cascaded wireless transmission devices 30-1 and 30-2 in an opposing station side connected to user network 40.

Wireless transmission device 20-1 includes division circuit 21, transmission circuit 22, reception circuit 23, control circuit 24, external LAN port 25, and branch LAN port 26. Wireless transmission device 20-2 includes division circuit 21, transmission circuit 22, reception circuit 23, control circuit 24, and external LAN port 25. Wireless transmission device 30-1 has the same configuration as wireless transmission device 20-1 and includes division circuit 31, transmission circuit 32, reception circuit 33, control circuit 34, external LAN port 35, and branch LAN port 36. Wireless transmission device 30-2 has the same configuration as wireless transmission device 20-2 and includes division circuit 31, transmission circuit 32, reception circuit 33, control circuit 34, and external LAN port 35. Signals 500, 501, and 502 in wireless transmission devices 30-1 and 30-2 correspond to signals 100, 101, and 102 in wireless transmission devices 20-1 and 20-2, respectively. Signal 601 in wireless transmission devices 30-1 and 30-2 corresponds to signal 201 in wireless transmission devices 20-1 and 20-2. Signals 701 and 702 in wireless transmission devices 30-1 and 30-2 correspond to signals 301 and 302 in wireless transmission devices 20-1 and 20-2, respectively. Signals 801 and 802 in wireless transmission devices 30-1 and 30-2 correspond to signals 401 and 402 in wireless transmission devices 20-1 and 20-2, respectively.

Division circuit 21 in wireless transmission device 20-1 receives an input of external LAN signal 100 from user network 10 via external LAN port 25 and divides the signal on a frame basis to output the resulting signals as transmitted signal 101 to transmission circuit 22 in the wireless direction, and as divided LAN signal 101 to adjacent wireless transmission device 20-2. Division circuit 21 also outputs link states of external LAN port 25 and branch LAN port 26 as link state notification signal 103 to control circuit 24. Division circuit 21 also performs link-down control for each of external LAN port 25 and branch LAN port 26, and stops transmitted signal 101 that is an output in the wireless direction, according to link control signal 401 that is input from control circuit 24. Division circuit 21 also combines received signal 301 that is input from reception circuit 23 and divided LAN signal 102 that is input from adjacent wireless transmission device 20-2, and outputs the combined signal as external LAN signal 100 to user network 10.

In order to divide the LAN signal in division circuit 21, this exemplary embodiment employs an approach of directing frames in the signal alternately to a wireless transmission device in the opposing station and to an adjacent wireless transmission device. As another approach, a MAC address or a VLAN ID stored in an IEEE 802.3-compliant overhead of the LAN signal, or an IP address in an IP header (if an IP packet compliant with RFC 791 or RFC 2460 is stored in a payload of the LAN signal), may be multiplied by a hash function. Then the result may be used to divide frames in the LAN signal into the two directions of a wireless transmission device in the opposing station and an adjacent wireless transmission device. The present invention is not limited to a specific dividing approach but any dividing approaches are applicable.

Transmission circuit 22 multiplexes transmitted signal 101 from division circuit 21 and alarm signal 402 from control circuit 24, and performs wireless modulation for the multiplexed signal. Transmission circuit 22 then outputs the modulated signal as wireless signal 201 to wireless transmission device 30-1 in the opposing station.

Reception circuit 23 separates received signal 301 as a main signal from wireless signal 601 incoming from wireless transmission device 30-1 and outputs received signal 301 to division circuit 21. Reception circuit 23 also multiplexes a signal indicating an abnormal state of wireless signal 601 from wireless transmission device 30-1, such as the occurrence of a lowered reception level or a signal error, and alarm signal 802 in wireless transmission device 30-1 separated from wireless signal 601. Reception circuit 23 then outputs the multiplexed signal as transferred alarm signal 302 to control circuit 24.

Control circuit 24 multiplexes link state notification signal 103 from division circuit 21 indicating link states of external LAN port 25 and branch LAN port 26, and transferred alarm signal 302 from reception circuit 23 indicating quality degradation of wireless signal 601. Control circuit 24 then outputs the multiplexed signal as alarm signal 402 to transmission circuit 22. Also, based on transferred alarm signal 302 from reception circuit 23, control circuit 24 detects quality degradation of wireless signals 201 and 601 and link-down states of external LAN ports 25 and 35 and branch LAN ports 26 and 36, notified by the wireless transmission device in the local station and the wireless transmission device in the opposing station. Control circuit 24 then outputs link control signal 401 to division circuit 21 for performing link control for each of ports 25 and 26, and when an abnormal condition of wireless signal 201 and 601 has been detected, according to link control logic shown in FIGS. 6 to 8 to be described later, for stopping transmitted signal 201 that is an output to the opposing station.

Wireless transmission device 20-1 is connected to its adjacent wireless transmission device 20-2 via branch LAN port 26 of wireless transmission device 20-1 and external LAN port 25 of wireless transmission device 20-2, between which LAN signal 102 is transmitted. Similarly, wireless transmission device 30-1, which is opposite to wireless transmission device 20-1, is connected to its adjacent wireless transmission device 30-2 via branch LAN port 36 of wireless transmission device 30-2 and external LAN port 35 of wireless transmission device 30-2, between which divided LAN signal 502 is transmitted.

Thus, in the wireless transmission system in this exemplary embodiment, a LAN signal is divided on a frame basis and combined in a wireless transmission device in the local station. This makes it possible to transmit LAN signal using not only the wireless transmission path of the wireless transmission device in the local station but also the wireless transmission path of the adjacent wireless transmission device. Therefore, transmission capacity can be increased depending on the number of wireless transmission devices without changing the wireless modulation scheme or the wireless band.

Second Exemplary Embodiment

Figure 5:
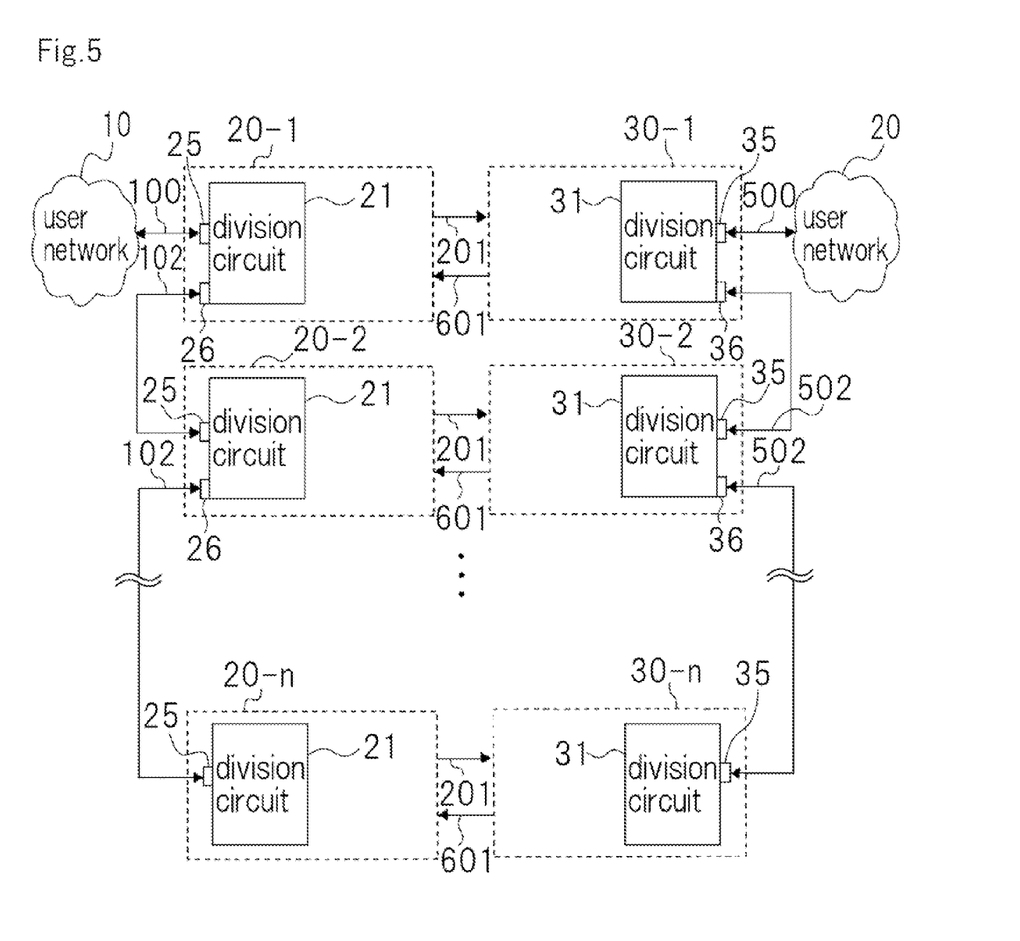
FIG. 5 is a block diagram of a wireless transmission system according to a second exemplary embodiment of the present invention.

FIG. 5 is a block diagram of a wireless transmission system according to a second exemplary embodiment of the present invention.

The wireless transmission system in this exemplary embodiment comprises cascaded wireless transmission devices 20-1, 20-2, . . . , 20-$n$ in the local station connected to user network 10, and cascaded wireless transmission devices 30-1, 30-2, . . . , 30-$n$ in the opposing station connected to user network 40, where n is an integer greater than two.

Wireless transmission devices 20-1, . . . , 20-($n$−1) have the same configuration, and wireless transmission device 20-$n$ has the same configuration as wireless transmission device 20-2 in FIG. 4. Wireless transmission devices 30-1, . . . , 30-($n$−1) have the same configuration as wireless transmission devices 20-1, . . . , 20-($n$−1), and wireless transmission device 30-$n$ has the same configuration as wireless transmission device 30-2 in FIG. 4.

Figure 6:
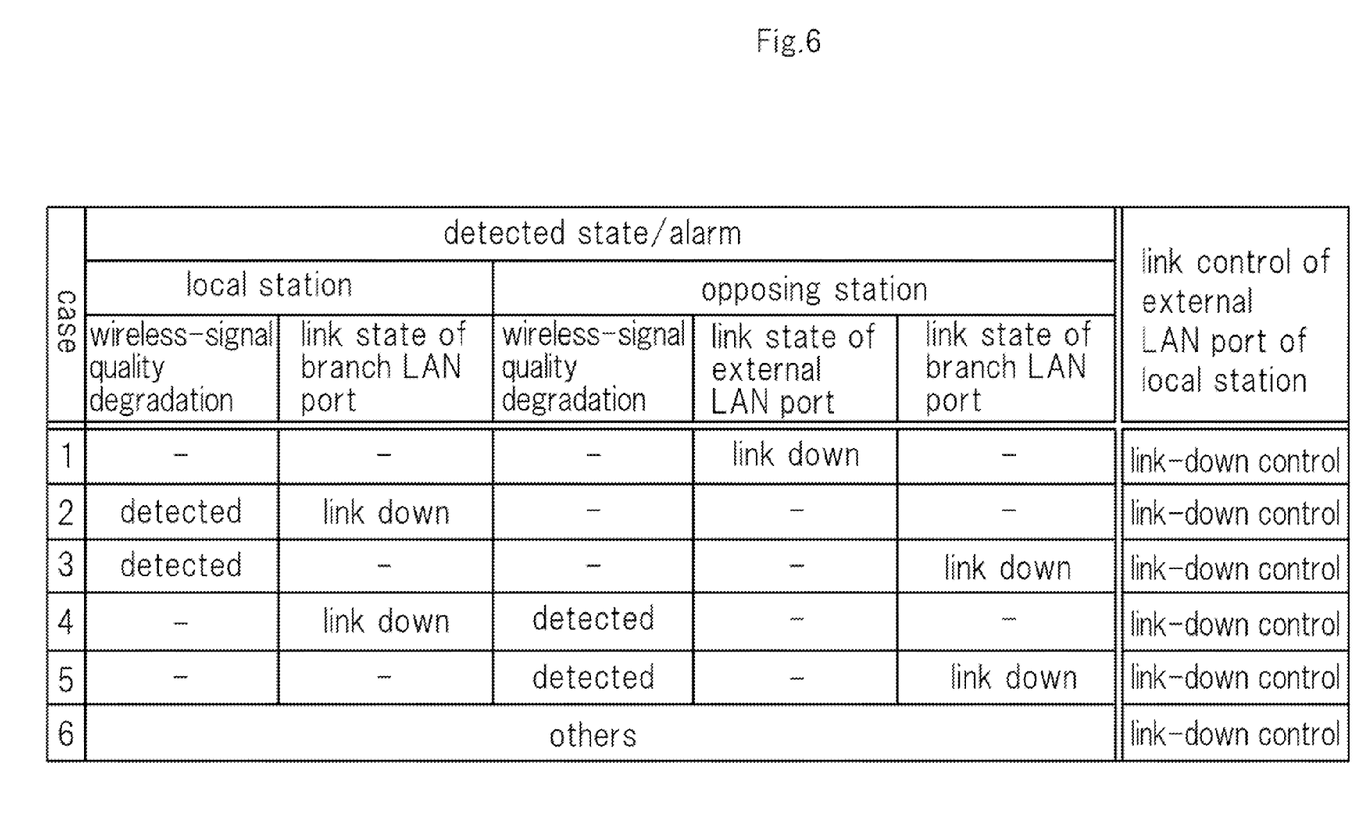
FIG. 6 is a table illustrating link control logic for external LAN ports in a wireless transmission device.

Here, control logic for external LAN port links in the wireless transmission devices in the first to (n−1)th stages will be described with reference to FIGS. 4 and 6. In FIG. 6, "-" denotes "don't care."

Link-down control is performed for external LAN port 25 of wireless transmission device 20-1 in the following cases.

1) External LAN port 35 of wireless transmission device 30-1, which is opposite to wireless transmission device 20-1, is in the link-down state (case 1 in FIG. 6).

2) Quality degradation of wireless signal 201 in wireless transmission device 20-1 is detected, and branch LAN port 26 of wireless transmission device 20-1 is in the link-down state (case 2 in FIG. 6).

3) Quality degradation of wireless signal 201 in wireless transmission device 20-1 is detected, and branch LAN port 36 of wireless transmission device 30-1, which is opposite to wireless transmission device 20-1, is in the link-down state (case 3 in FIG. 6).

4) Quality degradation of wireless signal 601 in wireless transmission device 30-1, which is opposite to wireless transmission device 20-1, is detected, and branch LAN port 26 in wireless transmission device 20-1 is in the link-down state (case 4 in FIG. 6).

5) Quality degradation of wireless signal 601 in wireless transmission device 30-1, which is opposite to wireless transmission device 20-1, is detected and branch LAN port 36 is in the link-down state (case 5 in FIG. 6).

When branch LAN ports 26 and 36 are not in use, external LAN ports 25 and 36 are linked down at the occurrence of an abnormal condition of a received signal in both the local and opposing stations.

In states other than the above cases (case 6 in FIG. 6), link-up control is performed for external LAN ports 25 and 35.

Link control logic for external LAN port in wireless transmission devices 20-2, . . . , 20-($n$−1) and 30-1, . . . , 20-($n$−1) are similar to link control logic for external LAN port in wireless transmission device 20-1.

Figure 7:
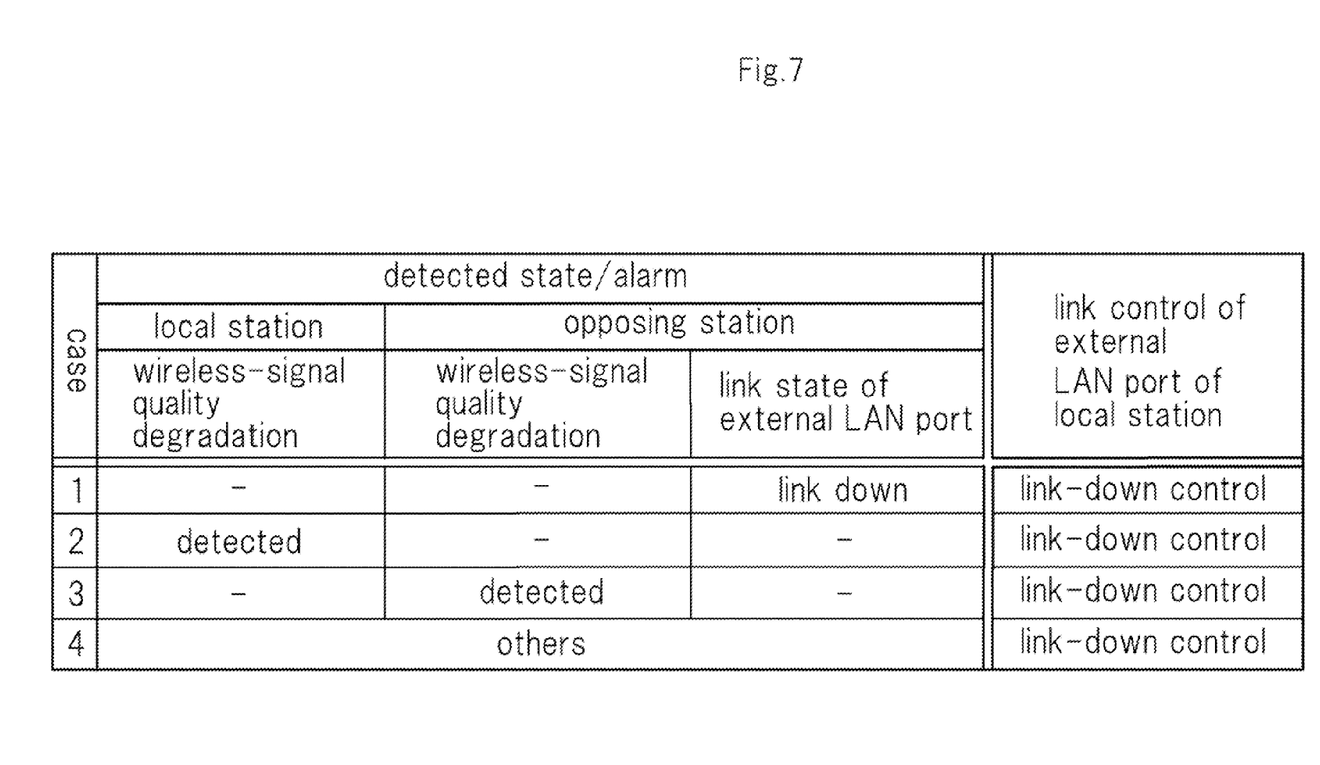
FIG. 7 is a table illustrating link control logic for external LAN ports in a wireless transmission device in the n-th stage.

Next, link control logic for external LAN port in wireless transmission device 20-$n$ in the n-th stage will be described with reference to wireless transmission devices 20-2 and 30-2 in FIG. 4, and to FIG. 7. In FIG. 7, "-" denoted "don't care."

When external LAN port 35 of wireless transmission device 30-2, which is opposite to wireless transmission device 20-2 in the local station, is in the link-down state, external LAN port 25 of wireless transmission device 20-2 is linked down (case 1 in FIG. 7). When abnormality of received signal 601 is detected in wireless transmission device 20-2 in the local station (case 2 in FIG. 7) or when abnormality of received signal 201 occurs in wireless transmission device 30-2 in the opposing station (case 3 in FIG. 7), external LAN port 25 of wireless transmission devices 20-2 in the local station and external LAN port 35 of wireless transmission devices 30-2 in the opposing station are linked down. In states other than the above cases (case 4 in FIG. 7), external LAN ports 25 and 35 are linked up.

Link control logic for external LAN port of wireless transmission device 30-2 are also similar to the link control logic for the external LAN port of wireless transmission device 20-2.

Figure 8:
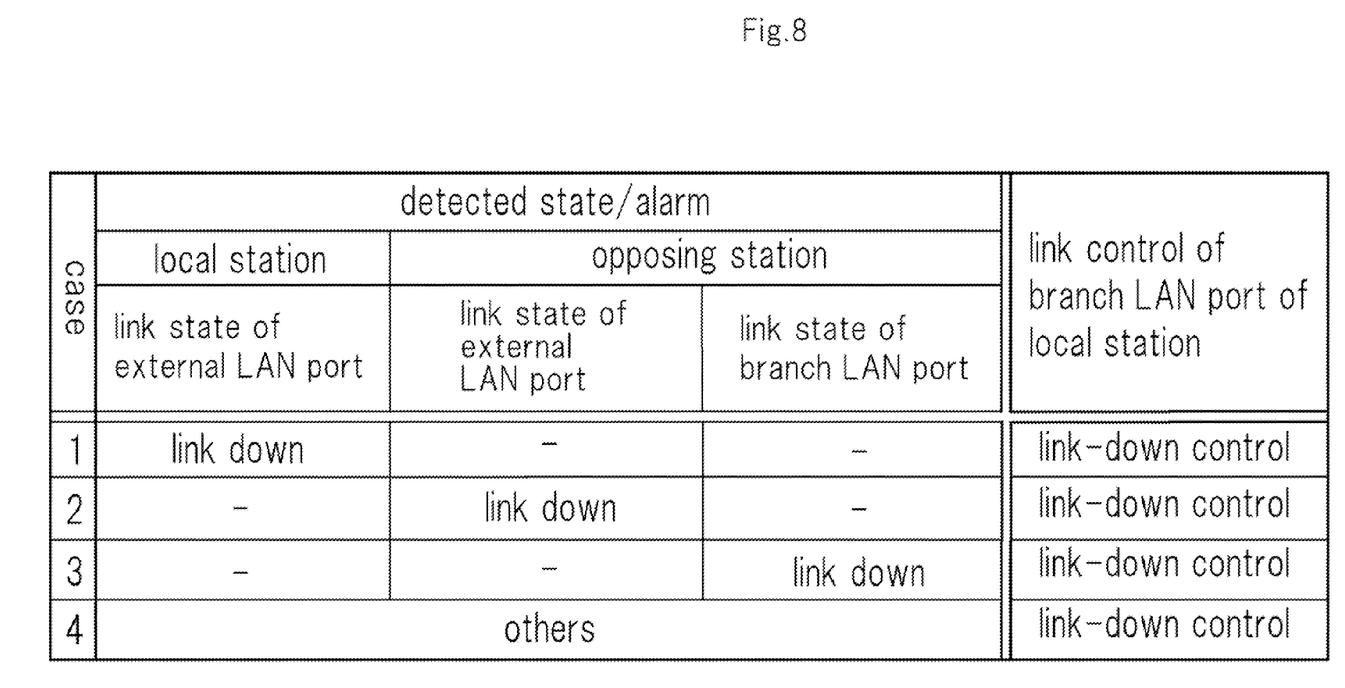
FIG. 8 is a table illustrating link control logic for branch LAN ports in a wireless transmission device.

Now, link control logic for branch LAN port will be described with reference to FIGS. 4 and 8. In FIG. 8, "-" denotes "don't care."

When external LAN port 25 of wireless transmission device 20-1 in the local station is linked down (case 1 in FIG. 8) or when external LAN port 35 or branch LAN port 36 of wireless transmission device 30-1 in the opposing station is linked down (cases 2 or 3 in FIG. 8), branch LAN port 26 of wireless transmission device 20-1 in the local station is linked down. In states other than the above cases, branch LAN ports 26 and 36 are linked up (case 4 in FIG. 8). It is to be noted that wireless transmission devices 20-$n$ and 30-$n$ in the n-th stage (the last stage) do not use branch LAN ports 26 and 36 as shown in FIG. 5, and therefore do not perform the above control.

Logic for stopping transmitted signal 101 that is an output to the opposing station are common to all the wireless transmission devices even in the n-stage configuration shown in FIG. 5. In FIG. 4, when quality degradation of wireless signal 601 received in reception circuit 23 of the wireless transmission device in the local station is detected, or when quality degradation of wireless signal 601 notified by the wireless transmission device in the opposing station is detected from transferred alarm signal 302, the output of transmitted signal 101 is stopped.

Now, a description will be given of signal transmission operations in the wireless transmission system of this exemplary embodiment for each of the cases at normal times, at the occurrence of abnormality of the wireless signal, at the occurrence of link-down of the external LAN port, at the occurrence of link-down of the branch LAN port, and at the simultaneous occurrence of the abnormality of the wireless signal and port link-down.

1) At Normal Times

At normal times, in wireless transmission device 20-1, external LAN signal 100 from user network 10 is divided on a MAC frame basis by division circuit 21 to be directed to wireless transmission device 30-1 in the opposing station and to adjacent wireless transmission device 20-2. The divided signals are output as transmitted signal 101 in the wireless direction, and as divided LAN signal 102 in the direction of the adjacent wireless transmission device. Transmitted signal 101 in the wireless direction is passed through transmission circuit 22 and through reception circuit 33 of wireless transmission device 30-1, and is input as received signal 701 to division circuit 31. Divided LAN signal 102 is output as transmitted signal 101 from division circuit 21 of wireless transmission device 20-2. Transmitted signal 101 is then passed through transmission circuit 22 and through reception circuit 33 of wireless transmission device 30-2, and is input as received signal 701 to division circuit 31. Received signal 701 is then input as divided LAN signal 502 to division circuit 31 in wireless transmission device 30-1. Division circuit 31 combines received signal 701 from the wireless direction and divided LAN signal 502 from adjacent wireless transmission device 30-2 and outputs the combine signal as external LAN signal 500 to user network 40.

Thus, in the wireless transmission system in this exemplary embodiment, the combination of the adjacent wireless transmission devices enables transmission capacity to be easily increased without changing the wireless modulation scheme or the wireless band.

2) At Quality Degradation of the Wireless Signal

In the wireless transmission system in FIG. 5, when quality degradation of the received wireless signal is detected due to quality degradation of the wireless transmission path or due to a device failure in the wireless transmission device in the opposing station, different operations are performed for wireless transmission devices 20-1 to 20-(n−1) and 30-1 to 30-(n−1) in the first to (n−1)th stages and for wireless transmission devices 20-n and 30-n in the n-th stage. Therefore, signal transmission operations will be described separately for these two groups of wireless transmission devices.

When quality degradation of wireless signal 601 is detected in reception circuit 23 of wireless transmission device 20-1, control circuit 24 detects this quality degradation through transferred alarm signal 302 from reception circuit 23, and outputs control signal 401 to division circuit 21 to stop transmitted signal 101 from being output to transmission circuit 22. Control circuit 24 also notifies wireless transmission device 30-1 of the quality degradation of wireless signal 601 with alarm signal 402 via transmission circuit 22. In wireless transmission device 30-1, reception circuit 33 separates transferred alarm signal 702 from wireless signal 201 and inputs transferred alarm signal 702 to control circuit 34. Control circuit 34 in wireless transmission device 30-1 detects the occurrence of the quality degradation of wireless signal 601, and outputs control signal 801 to division circuit 31 to stop transmitted signal 501 from being output to transmission circuit 32. Division circuits 21 and 31 in turn transfer all LAN signals from external LAN ports 25 and 35 to branch LAN ports 26 and 36, respectively. In this manner, only signal transmission with abnormal wireless signals can be stopped and signal transmission using wireless transmission devices with normal wireless signals can be continued.

Operations when quality degradation of wireless signal 201 is detected in reception circuit 33 of wireless transmission device 30-1 are similar to the above, except that the above relationship between wireless transmission devices 20-1 and 30-1 is reversed.

In wireless transmission devices 20-n and 30-n in the n-th stage, branch LAN ports 26 and 36 are unconnected, and therefore always in the link-down state. This case will be described with reference to wireless transmission devices 20-2 and 30-2 in FIG. 4. When quality degradation of wireless signal 201 or 601 between wireless transmission devices 20-2 and 30-2 occurs, the quality degradation is detected, the transmitted signal is stopped, and notification to the wireless transmission device in the opposing station is provided in the same manner as in wireless transmission devices 20-1 and 30-1. In addition, external LAN ports 25 and 35 are linked down according to the link control logic for external LAN port in FIG. 7 (cases 2 and 3). With this link down, branch LAN ports 26 and 36 of wireless transmission devices 20-1 and 30-1 in the first stage also enter the link-down state, so that the signal transmission is stopped between wireless transmission devices 20-1, 30-1 in the first stage and wireless transmission devices 20-2, 30-2 in the second stage.

Thus, in the wireless transmission system in this exemplary embodiment, when quality degradation of the wireless signal is detected, the wireless transmission devices in the local and opposing stations stop the transmitted signal in the wireless direction and transfer all LAN signals from external LAN ports 25 and 35 to branch LAN ports 26 and 36 for wireless transmission devices 20-1 to 20-(n−1) and 30-1 to 30-(n−1) in the first to (n−1)th stages. This makes it possible to stop only signal transmission with abnormal wireless signals and to continue signal transmission using wireless transmission devices with normal wireless signals. For wireless transmission devices 20-n and 30-n in the n-th stage, link-down control is performed for external LAN ports 25 and 35 in addition to stopping the transmitted signal in the direction of the opposing station. This make it possible to prevent continuous frame loss of LAN signals due to the abnormal condition in the wireless transmission path or the wireless transmission device, and to continue signal transmission by using the wireless transmission devices in the preceding stages with normal wireless signals.

3) At Link-Down of the External LAN Port

Operations performed when the external LAN port enters the link-down state due to a user network failure or due to an abnormal condition of a connection cable between the devices are the same for all wireless transmission devices 20-1 to 20-n and 30-1 to 30-n in the first to n-th stages. Therefore, operations will be described for wireless transmission devices 20-1 and 30-1 in FIG. 4.

When external LAN port 25 of wireless transmission device 20-1 is in the link-down state, control circuit 24 detects the link-down state through link state notification signal 103 from division circuit 21. Control circuit 24 determines link-down according to the link control logic for branch LAN port for case 1 in FIG. 8 and outputs the determination result as link control signal 401. Division circuit 21 links down branch LAN port 26 based on link control signal 401. Control circuit 24 also notifies wireless transmission device 30-1 in the opposing station of the link-down state of external LAN port 25 via transmission circuit 22. In wireless transmission device 30-1, control circuit 34 detects the link-down state of external LAN port 25 of wireless transmission device 20-1 based on transferred alarm signal 702 separated from wireless signal 201 in reception circuit 33. Control circuit 34 determines link control based on the control logic for case 1 in FIG. 6, case 1 in FIG. 7, and case 2 in FIG. 8, and outputs the determination result as link control signal 801 to division circuit 31. Division circuit 31 in turn links down external LAN port 35 and branch LAN port 36 based on link control signal 801.

Operations performed when the link-down state of external LAN port 35 of wireless transmission device 30-1 occurs are similar to the above, except that the relationship between wireless transmission devices 20-1 and 30-1 in the above operation description is reversed.

Thus, in the wireless transmission system in this exemplary embodiment, when link-down of the external LAN port occurs, link-down control for the external LAN port of the wireless transmission device in the opposing station and link-down control for the branch LAN ports of the wireless transmission devices in the local and opposing stations are performed. This makes it possible to stop signal transmission between the wireless transmission devices in the current stage and the wireless transmission devices in the following stage, and to continue signal transmission using only normally-linked wireless transmission devices in the preceding stages.

4) At Link-Down of the Branch LAN Port

Operations performed when the branch LAN port enters the link-down state due to link-down of the external LAN port of the transmission device in the following stage or when an abnormal condition of a connection cable between the devices occurs are the same for all wireless transmission devices 20-1 to 20-($n$−1) and 30-1 to 30-($n$−1) in the first to ($n$−1)th stages. Therefore, operations will be described for wireless transmission devices 20-1 and 30-1 in FIG. 4. Wireless transmission devices 20-$n$ and 30-$n$ in the n-th stage will always be in the link-down state because branch LAN ports 26 and 36 are not used, and therefore operations thereof will not be described.

When branch LAN port 26 in wireless transmission device 20-1 enters the link-down state, control circuit 24 detects the link-down state through link state notification signal 103 as in the above-described case for external LAN port 25, and notifies control circuit 34 of the link-down state via transmission circuit 22 and via reception circuit 33 of wireless transmission device 30-1. Control circuit 34 in turn detects the link-down state of branch LAN port 26 of wireless transmission device 20-1. Control circuit 34 determines link control according to the link control logic for branch LAN port for case 3 in FIG. 8 and outputs the determination result as link control signal 801 to division circuit 31. Division circuit 31 in turn links down branch LAN port 36 based on link control signal 801.

Operations performed when the link-down state of branch LAN port 26 of wireless transmission device 30-1 occurs are similar to the above, except that the relationship between wireless transmission devices 20-1 and 3-1 in the above operation description is reversed.

Thus, in the wireless transmission system in this exemplary embodiment, when link-down of the branch LAN port occurs, link-down control for the branch LAN port of the wireless transmission device in the opposing station is performed. This makes it possible to stop signal transmission with the wireless transmission devices in the following stage in which the wireless transmission devices may be incapable of normal communication, and to continue signal transmission by using only normal wireless transmission devices.

5) Quality Degradation of the Wireless Signal and Link Down of the External LAN Port Operations performed when link down of the external LAN port occurs while quality degradation of the wireless signal is detected are similar to the above-described operations at link down of the external LAN port, and therefore will not be described.

6) Quality Degradation of the Wireless Signal and Link Down of the Branch LAN Port Operations performed when link down of the branch LAN port occurs while quality degradation of the wireless signal is detected are the same for all wireless transmission devices 20-1 to 20-$n$ and 30-1 to 30-$n$ in the first to n-th stages. Therefore, the operations will be described with reference to wireless transmission devices 20-1 and 30-1 in FIG. 4.

When quality degradation of wireless signal 201 as well as link down of branch LAN port 26 occur, control circuit 24 of wireless transmission device 20-1 detects this state, determines link control according to the control logic for case 2 in FIG. 6, and outputs the determination result as link control signal 401 to division circuit 21, as in the above-described quality degradation of the wireless signal and link down of the branch LAN port. Division circuit 21 performs link-down control for external LAN port 25 based on link control signal 401. Control circuit 24 notifies control circuit 34 of the quality degradation of wireless signal 201 and the link-down state of branch LAN port 26 via transmission circuit 22 and via reception circuit 33 of wireless transmission device 30-1. Control circuit 34 in turn determines link control according to the control logic for case 5 in FIG. 6 and outputs the determination result as link control signal 801 to division circuit 31. Division circuit 31 performs link-down control for external LAN port 35 and branch LAN port 36 based on link control signal 801.

Thus, in the wireless transmission system in this exemplary embodiment, when quality degradation of the wireless signal as well as link-down of the branch LAN port occur, it determined that signal transmission in the wireless transmission device in question and in the wireless transmission device in the following stage connected to the branch LAN port is impossible, and the external LAN ports in the local and opposing station are linked down. This makes it possible to stop signal transmission between devices following the wireless transmission device in question, and to continue signal transmission by using only the normal wireless transmission devices preceding the wireless transmission device in question.

Third Exemplary Embodiment

Each wireless transmission device in the wireless transmission system in the first exemplary embodiment shown in FIG. 4 and the wireless transmission system in the second exemplary embodiment shown in FIG. 5 includes a single transmission circuit and a single reception circuit. In contrast, wireless transmission device 20-1 in a wireless transmission system in a third exemplary embodiment shown in FIG. 9 includes two transmission circuits 22$a$ and 22$b$ and two reception circuits 23$a$ and 23$b$ (the same in other wireless transmission devices), thus realizing redundancy of the wireless transmission path.

Figure 9:
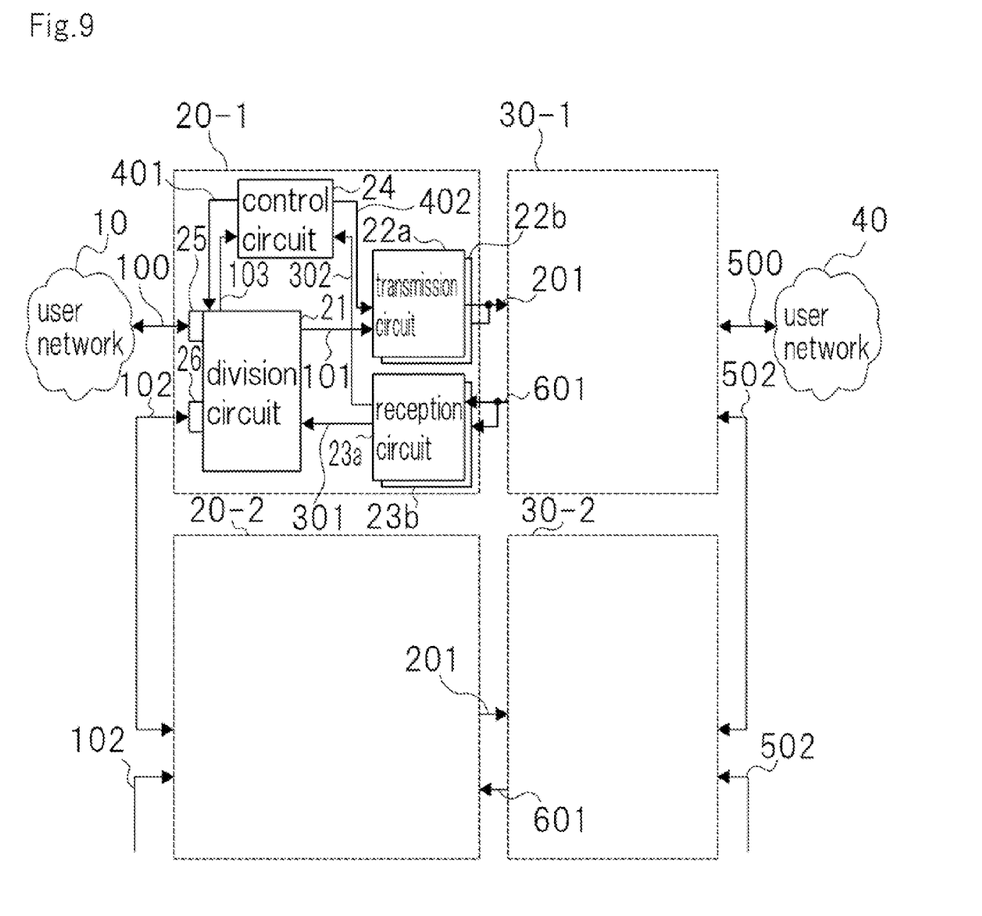
FIG. 9 is a block diagram of a wireless transmission system according to a third exemplary embodiment of the present invention.

In FIG. 9, division circuit 21 of wireless transmission device 20-1 divides external LAN signal 100 from user network 20 into transmitted signal 101 that is a divided signal directed to the opposing station, and divided LAN signal 102 that is a divided signal directed to the adjacent wireless transmission device. Transmitted signal 101 is output to each of transmission circuits 22a and 22b. Transmission circuits 22a and 22b multiplex input transmitted signal 101 and alarm signal 402 from control circuit 24 and perform wireless modulation for the multiplexed signal. The modulated signal is output as wireless signal 201 from one of the transmission circuits. When an abnormal condition occurs in the transmission circuit that is outputting wireless signal 201, the transmission circuit is switched to the other transmission circuit, thus configuring redundancy of the transmission circuit.

Reception circuits 23a and 23b each receive wireless signal 601 from the opposing station, perform wireless demodulation for the received signal, and separate the demodulated signal into transferred alarm signal 302 and received signal 301. The separated signals are output from one of the reception circuits. When quality degradation of the wireless signal is detected in one of the reception circuits due to an abnormal condition in the wireless transmission path or the wireless transmission device, the reception circuit is switched to the other reception circuit that has received normal received signals, which then outputs transfer alarm 302 and received signal 301, thus configuring redundancy of the reception circuit.

Other wireless transmission devices operate similar to wireless transmission device 20-1.

The above-described approach to providing redundancy of the wireless transmission path is only an example, and there are many other existing approaches. Such existing approaches and the wireless transmission devices of the present invention can be combined with any approach to provide redundancy of the wireless transmission path.

Thus, in addition to the capabilities realized by the wireless transmission system in FIG. 4, the wireless transmission system in this exemplary embodiment can provide increased tolerance for a device failure or quality degradation of the wireless transmission path by virtue of redundancy of the wireless transmission path within the individual wireless transmission devices.

Fourth Exemplary Embodiment

The first to third exemplary embodiments employ a single external LAN port as a connection terminal to the user network, and a single branch LAN port as a connection terminal to the adjacent wireless transmission device. In contrast, a fourth exemplary embodiment shown in FIG. 10 employs double external LAN ports and double branch LAN ports.

Figure 10:
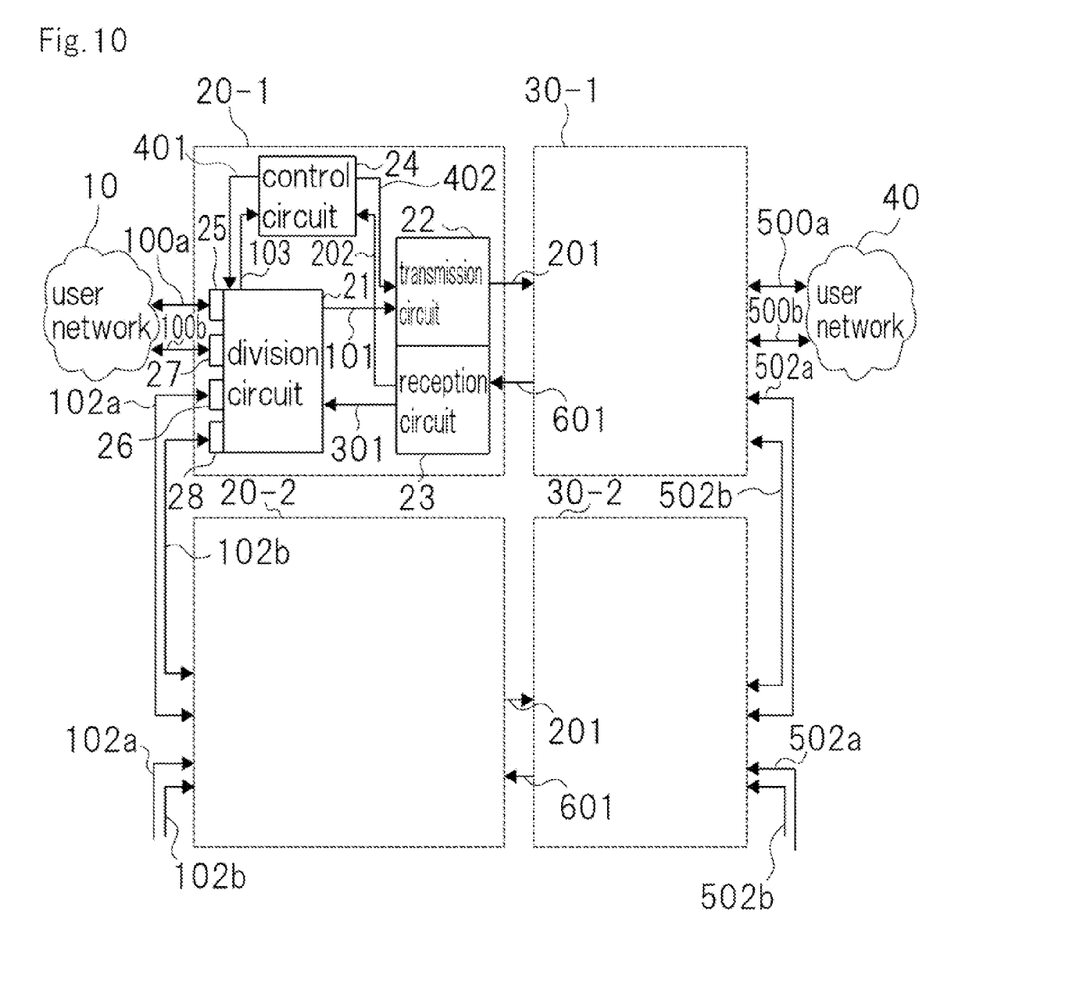
FIG. 10 is a block diagram of a wireless transmission system according to a fourth exemplary embodiment of the present invention.

Division circuit 21 in wireless transmission device 20-1 in FIG. 10 connects with user network 10 via two external LAN ports 25 and 27. At normal times, signal transmission is performed while control circuit 24 performs link-down control for either one of the external LAN ports and uses only the other external LAN port based on control signal 401. If the port being used for the signal transmission enters the link-down state due to a failure in the user network, a cable, or a connector, the abnormal condition is detected through link state notification signal 103. Then, the originally linked-down port can be linked up to resume the signal transmission by using the port that is different from the port linked down due to the external cause.

As in the wireless transmission system in the first exemplary embodiment, when a condition for performing link-down control for the connection port to the user network (any of cases 1 to 5 in FIG. 6 and cases 1 to 3 in FIG. 7) is satisfied, both external LAN ports 25 and 27 are linked down to notify user network 10 and the adjacent wireless transmission device of the abnormal condition.

As with external LAN ports 25 and 27, the branch LAN port for connection with the adjacent wireless transmission device is also implemented as redundant branch LAN ports 26 and 28. If any of the conditions for cases 1 to 3 in FIG. 8 is satisfied, link-down control is performed for both branch LAN ports 26 and 28 to notify the adjacent wireless transmission device of the abnormal condition.

Thus, in addition to the capabilities realized by the first to third wireless transmission systems, the wireless transmission system according to this exemplary embodiment can provide increased tolerance for a failure in the user network itself or in the connection with the user network, and a failure in the connection with the adjacent wireless transmission device.

The wireless transmission devices shown in FIGS. 9 and 10 may be combined to provide redundancy in all of the wireless transmission paths, the connection with the user network, and the connection between the wireless transmission devices.

Wirelessly transmitted signals may be signals other than LAN signals.

While the exemplary embodiments have been described by using specific terms, it is to be understood that such description is only for illustrative purposes and various alterations and modifications are possible without departing from the following claims.

The invention claimed is:

1. A wireless transmission method of transmitting and receiving a signal between wireless transmission devices opposite to each other, the method comprising:

dividing a first input signal by a first wireless transmission device;

transmitting one divided first signal to a second wireless transmission device opposite to said first wireless transmission device;

outputting the other divided first signal to a third wireless transmission device adjacent to said first wireless transmission device and further transmitting the other divided first signal via a fourth wireless transmission device opposite to said third wireless transmission device to said second wireless transmission device adjacent to said fourth wireless transmission device;

combining the signals received respectively from said first and fourth wireless transmission devices and outputting the combined signal by said second wireless transmission device;

dividing a second input signal by said second wireless transmission device;

transmitting one branch second signal to said first wireless transmission device;

transmitting the other branch second signal to said first wireless transmission device via said fourth and third wireless transmission devices; and combining the signals received respectively from said second and third wireless transmission devices and outputting the combined signal by said first wireless transmission device, wherein when an abnormal condition occurs in a wireless transmission path, a wireless transmission device among the wireless transmission devices, or a connection between the wireless transmission devices, the abnormal wireless transmission device and the abnormal wireless transmission path are disconnected from a system by performing port link-down control to continue signal transmission with normal wireless transmission devices, and wherein after detecting the abnormal condition, the first wireless transmission device stops the transmission of the one divided first signal abnormal signal and transmits a notification signal indicating the abnormal condition to the second wireless transmission device; and the second transmission device stops the transmission of the one branch second signal.

2. The wireless transmission method according to claim 1, wherein when said first wireless transmission device detects an abnormal condition of a wireless signal received from said second wireless transmission device from the wireless signal, it stops signal transmission to a wireless transmission path toward said second wireless transmission device.

3. The wireless transmission method according to claim 1, wherein when said first wireless transmission device detects a link-down state of an external port of said first wireless transmission device, it performs link-down control for a branch port of said first wireless transmission device to stop signal transmission between said first and third wireless transmission devices.

4. The wireless transmission method according to claim 1, wherein when said first wireless transmission device detects a link-down state of a branch port of said first wireless transmission device, it performs link-down control for a branch port of said second wireless transmission device to stop signal transmission between said second and fourth wireless transmission devices.

5. The wireless transmission method according to claim 1, wherein when said first wireless transmission device detects quality degradation of a wireless signal of said first wireless transmission device or of a wireless signal of said second wireless transmission device and a link-down state of a branch port of said first wireless transmission device, it performs link-down control for an external port and a branch port of said second wireless transmission device.

6. A wireless transmission device for transmitting and receiving a wireless signal to and from another wireless transmission device, the device comprising:

a transmission circuit that transmits a wireless signal to an opposing wireless transmission device;

a reception circuit that receives a wireless signal from said opposing wireless transmission device; and a division circuit that divides an input signal and that combines signals, wherein said division circuit divides an input signal, transmits one divided signal to said opposing wireless transmission device, transmits the other divided signal to an adjacent wireless transmission device, combines signals received respectively from said adjacent wireless transmission device and said opposing wireless transmission device, and outputs the combined signal, wherein when an abnormal condition occurs in a wireless transmission path, the wireless transmission device, the other wireless device or a connection between the wireless transmission device and the other wireless device, the abnormal wireless transmission device and the abnormal wireless transmission path are disconnected from a system by performing port link-down control to continue signal transmission with normal wireless transmission devices, and wherein after detecting the abnormal condition, the wireless transmission device stops the transmission of the one divided first signal abnormal signal and transmits a notification signal indicating the abnormal condition to the opposing wireless transmission device; and the opposing wireless transmission device stops transmission of a branch second signal to the wireless transmission device.

7. The wireless transmission device according to claim 6, further comprising an external port though which a signal is input, and a branch port through which a signal is output to said adjacent wireless transmission device.

8. The wireless transmission device according to claim 7, further comprising a control circuit that receives a link state signal indicating a link state of each port from said division circuit and that outputs a link control signal for performing link control for each port to said division circuit.

9. The wireless transmission device according to claim 8, wherein said division circuit performs link-down control for each port according to the link control signal that is input from said control circuit.

10. The wireless transmission device according to claim 8, wherein said division circuit stops signal output to said transmission circuit according to the link control signal that is input from said control circuit.

11. The wireless transmission device according to claim 10, wherein when said control circuit detects an abnormal condition of a wireless signal received from said opposing wireless transmission device from the wireless signal, said division circuit stops signal transmission to a wireless transmission path toward said opposing wireless transmission device.

12. The wireless transmission device according to claim 9, wherein when said control circuit detects a link-down state of the external port and outputs the link control signal, said division circuit performs link-down control for the branch port to stop signal transmission with said adjacent wireless transmission device.

13. The wireless transmission device according to claim 9, wherein when said control circuit detects a link-down state of the branch port, it performs link-down control for a branch port of said opposing wireless transmission device to stop signal transmission between said opposing wireless transmission device and a wireless transmission device adjacent to said opposing wireless transmission device.

14. The wireless transmission device according to claim 9, wherein when said control circuit detects quality degradation of a wireless signal of said wireless transmission device or of a wireless signal of said opposing wireless transmission device and a link-down state of the branch port of said wireless transmission device, it performs link-down control for an external port and a branch port of said opposing wireless transmission device.

15. The wireless transmission device according to claim 6, wherein said transmission circuit and said reception circuit are redundantly configured.

16. The wireless transmission device according to claim 6, wherein the external port and the branch port are redundantly configured.

* * * * *